Dec. 27, 1927.

W. G. POWELL 1,654,270

BRAKE MECHANISM

Filed March 18, 1925     2 Sheets-Sheet 1

Inventor
William G. Powell

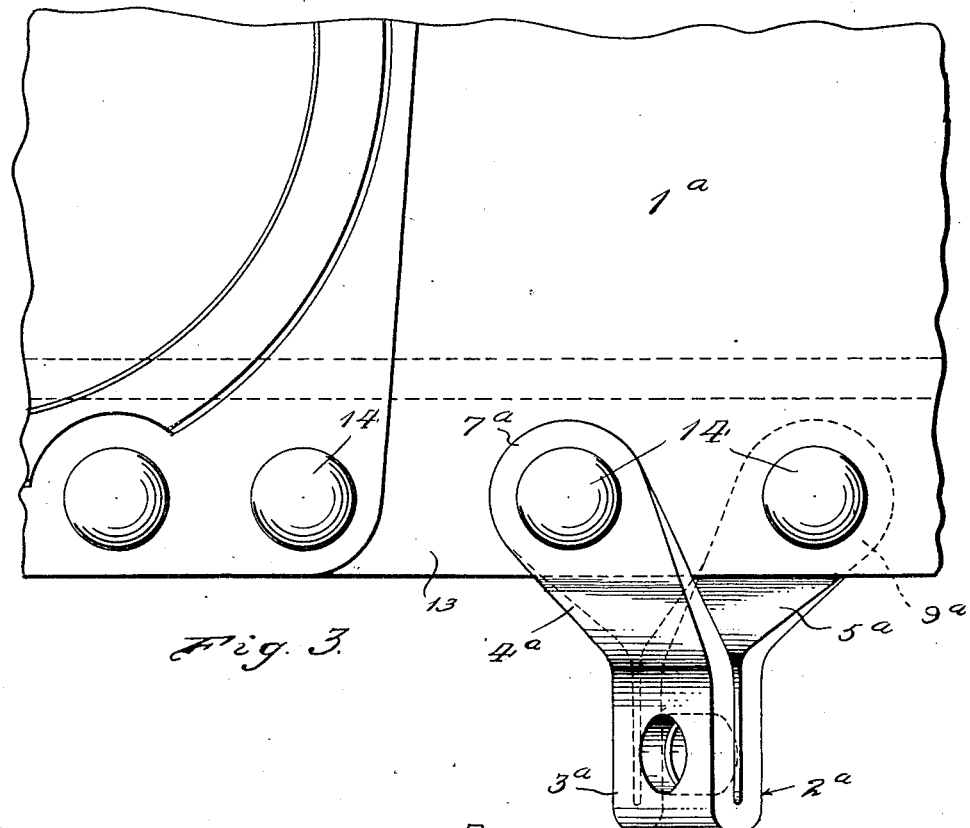
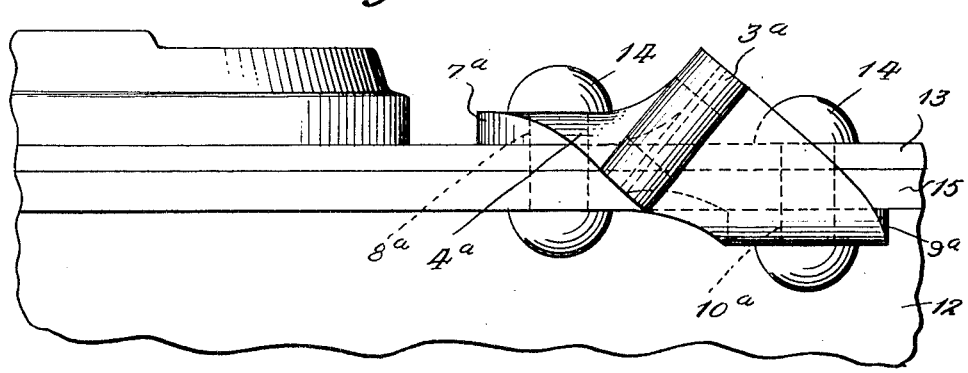

Patented Dec. 27, 1927.

1,654,270

UNITED STATES PATENT OFFICE.

WILLIAM G. POWELL, OF ALTOONA, PENNSYLVANIA.

BRAKE MECHANISM.

Application filed March 18, 1925. Serial No. 16,471.

This invention relates to brake mechanism, and more particularly to an improved dead lever fulcrum bracket.

An object of the invention is to provide a brake mechanism bracket which may be cheaply and easily constructed and readily applied to a truck bolster.

Another object of my invention is the provision of a dead lever fulcrum bracket which may be readily manufactured by bending a flat strip of metal to form a doubled fulcrum portion and diverging arm portions adapted for connection with different walls of the truck bolster at different elevations.

A further object of my invention is the provision of a dead lever fulcrum bracket which may be manufactured of relatively light plate without any casting operation whatsoever, but, on account of its construction and mode of connection to the truck bolster, has ample strength to resist the forces applied thereto in service.

Other objects and advantages of the invention will become apparent as the description proceeds.

Referring to the drawings illustrating my invention, the scope whereof is pointed out in the claims:

Figure 3 is a plan view of a fragmentary portion of a truck bolster of slightly different construction, showing a modified form of my brake mechanism bracket connected thereto.

Figure 4 is a side elevation of the portion of the bolster and connected bracket, as shown in Figure 3.

Figure 1:
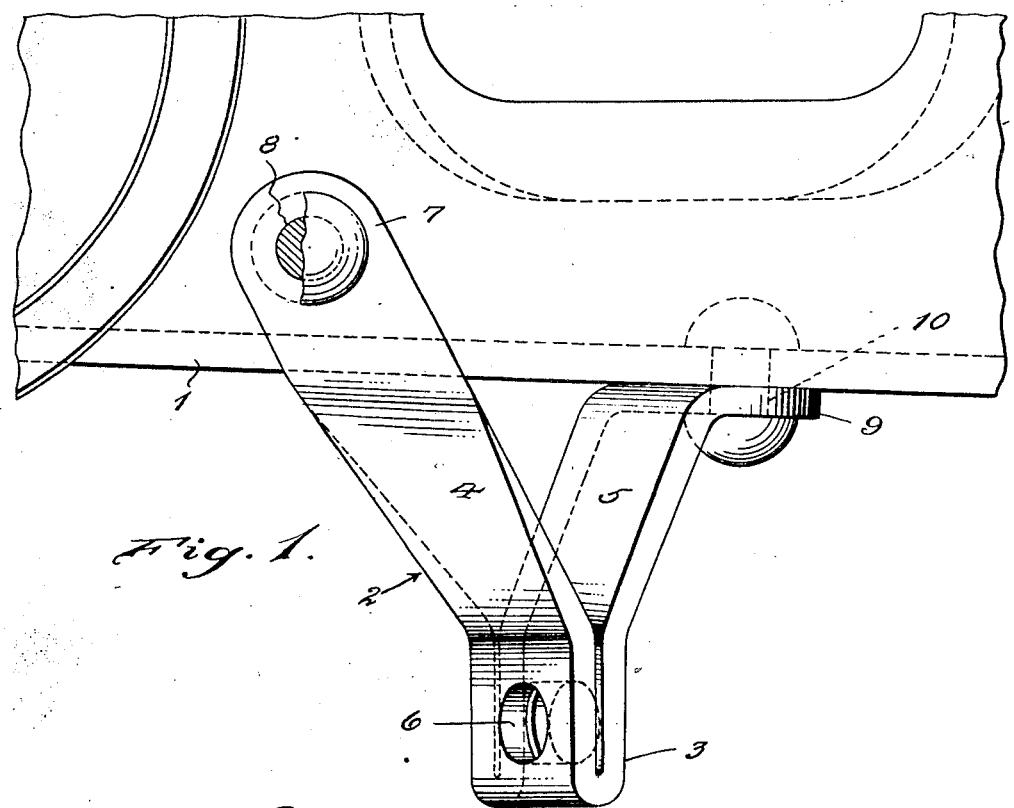
Figure 1 is a plan view of a fragmentary portion of a truck bolster showing one form of my improved brake mechanism bracket connected thereto.
Figure 2:
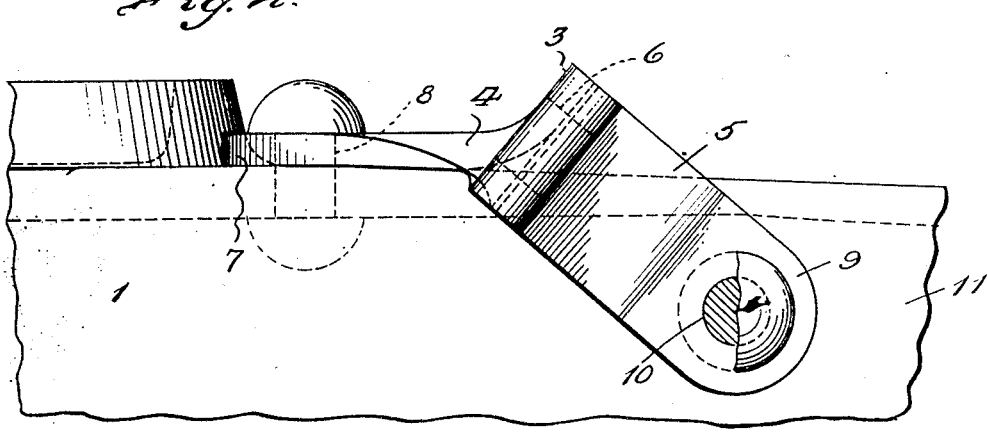
Figure 2 is a side elevation of a fragmentary portion of the bolster and associated brake mechanism bracket, as shown in Figure 1.

Referring to the drawings, in which similar reference characters designate corresponding parts and considering first Figures 1 and 2, there is represented at 1 a fragmentary portion of a truck bolster with an embodiment of my improved brake mechanism bracket 2 connected therewith.

As illustrated, I have shown my brake mechanism bracket 2, which is more specifically a dead lever fulcrum bracket, as formed by bending a flat straight strip of metal to form the doubled or bifurcated fulcrum portion 3 with diverging or flaring arm or leg portions 4 and 5 extending therefrom. The fulcrum portion 3 is formed with a suitable aperture 6, extending therethrough, adapted to receive a fulcrum pin for connection with the dead lever of brake mechanism, as will be understood.

The leg portion 4 is formed with a foot portion 7 which is perforated at 8 for the reception of rivet or other connecting means for attachment to the upper wall of the bolster 1. The leg 5 is formed with a foot portion 9, suitably perforated at 10, for the reception of a rivet or other connecting means for attachment to a side wall 11 of the bolster 1.

As ordinarily constructed, dead lever fulcrum brackets are cast to form a base or seat portion with an outwardly extending bracket portion suitably perforated for the reception of a dead lever fulcrum pin. Such a construction necessitates the connection of the bracket to a single wall or surface of the bolster.

By virtue of my improved construction, I connect the dead lever fulcrum bracket to a plurality of bolster walls, in the present embodiment to the top wall and a side wall of said bolster. Such a connection serves to more strongly brace the bracket and results in a more rigid connection with the bolster. This will be apparent because, by spacing the connecting rivets or other means at a greater distance apart and in angularly disposed or spaced planes, a greater arm is provided between said rivets for resisting forces applied to said bracket.

Referring to Figures 3 and 4, a modified form of bolster 1ª, to which is connected a slightly different form of my dead lever fulcrum bracket 2ª, is illustrated. The bolster 1ª, in the present instance, comprises channels or channel-shaped pressings 12 connected to a cover plate 13 by means of rivets or other connecting members 14, said cover plate being preferably connected to the outwardly extending flanges 15 of said channels.

Although, as in the previous embodiment, my dead lever fulcrum bracket may be connected to the top wall and a side wall of the bolster, yet it is preferred to connect said bracket, as illustrated, to the top of the cover plate 13 and the bottom of an outwardly extending flange 15, by rivets which serve to connect said cover plate and flange. Such a construction avoids the necessity of forming additional rivet holes in the bolster and thereby further cheapens the construction. As in the previous modification, however, my dead lever fulcrum bracket is formed from a flat strip of metal doubled on itself to form the fulcrum portion 3ª and outwardly flaring arm or leg portions 4ª and 5ª.

The portion 4ª is formed with a foot portion 7ª, suitably perforated at 8ª for the reception of a rivet 14 for connecting the same with the cover plate 13 and flange 15, preferably adjacent the upper surface of the cover plate 13. Likewise, the portion 5ª is formed with a foot 9ª, suitably perforated at 10ª, for receiving a rivet 14 for connection with the flange of the channel member 12 and the cover plate 13, preferably adjacent the lower surface of the flange 15 of said channel member.

On account of such construction, the dead lever fulcrum bracket is connected to the bolster with substantially no additional connecting cost as the same rivets which unite the cover plate and channel portions of the bolster serve for connecting the bracket thereto. As in the previous embodiment, however, the bracket is connected to different surfaces or walls of the bolster and at different elevations, thereby providing a very rigid and strong connection and permitting the employment of a lighter bracket and one which is cheaper to construct.

The fulcrum brackets constructed in accordance with my invention are preferably made by doubling pieces of steel on themselves and extending the ends to form feet which are riveted to the bolster in different planes at right angles to each other, such as shown in Figures 1 and 2. The construction, however, shown in Figures 3 and 4 is very efficient and particularly adapted to a built-up form of bolster, as illustrated.

To give a general idea of what may be saved by using brackets such as disclosed in the present application, it may be stated that, assuming a definite cost for applying the present A. R. A. standard bracket to the integral center plate type of bolster, a bracket, such as illustrated in Figures 1 and 2, may be applied to the same type of bolster for little more than half that cost. Likewise, a bracket such as shown in Figures 3 and 4, may be applied to a steel bolster, such as there illustrated, for less than half the cost of applying the standard bracket. It will, therefore, be apparent that the percentage of saving, by using brackets in accordance with my invention, is very high and this saving is readily effected without any decrease in the strength of connection between the dead lever and the bolster.

Having now described my invention, I claim:

1. In combination, a bolster and a dead lever fulcrum bracket comprising a fulcrum portion and angularly extending arms connected respectively to different faces of the bolster at different elevations.

2. In combination, a bolster and a dead lever fulcrum bracket constructed as a flat straight plate bent to form a fulcrum portion and angularly diverging arms, said arms being connected, at different elevations, to different faces of the bolster.

3. In combination, a bolster and a dead lever fulcrum bracket connected thereto on angularly disposed faces thereof and at different elevations.

4. In combination, a bolster and a dead lever fulcrum bracket, formed as a flat straight plate bent to provide diverging attaching portions, connected to said bolster on angularly disposed faces thereof and at different elevations.

5. In combination, a bolster having a top wall and a side wall, and a brake mechanism bracket bifurcated to form connecting arms, said arms being respectively connected to the top and side walls of the bolster.

6. In combination, a truck bolster with walls arranged in different planes and a brake mechanism bracket with diverging arms attached to different bolster walls at different elevations.

7. In combination, a truck bolster with angularly disposed walls and a brake mechanism bracket with diverging arms attached to different bolster walls at different elevations.

8. A brake mechanism bracket comprising a flat straight strip of metal bent double and perforated near the bend to form a fulcrum portion, the ends of said strip being angularly disposed and formed with feet portions angularly positioned with respect to each other and adapted for connection to an upper and side wall respectively of a bolster.

9. A dead lever fulcrum bracket for brake mechanism comprising a straight strip of metal bent to form a doubled fulcrum portion with flaring legs extending therefrom, said legs at their outer ends being provided with feet portions angularly arranged with respect to each other and adapted for connection to different bolster walls disposed at different elevations and angularly positioned with respect to each other.

10. A dead lever fulcrum bracket for brake mechanism comprising a straight strip of metal bent to form a doubled fulcrum portion with flaring legs extending therefrom, said legs at their outer ends being provided with feet portions angularly disposed to each other and adapted for connection to angularly disposed walls of the bolster at different elevations.

In testimony whereof I affix my signature.

WILLIAM G. POWELL.